United States Patent
Jin et al.

(10) Patent No.: US 8,867,374 B2
(45) Date of Patent: *Oct. 21, 2014

(54) LINK ADAPTATION FOR RETRANSMISSION SCHEMES

(75) Inventors: Hang Jin, Plano, TX (US); Li Guo, Allen, TX (US); Hanqing Lou, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/616,066

(22) Filed: Sep. 14, 2012

(65) Prior Publication Data

US 2013/0003564 A1     Jan. 3, 2013

Related U.S. Application Data

(63) Continuation of application No. 12/749,920, filed on Mar. 30, 2010, now Pat. No. 8,320,273.

(51) Int. Cl.
*H04W 24/00*     (2009.01)
(52) U.S. Cl.
USPC .......................................... 370/242
(58) Field of Classification Search
CPC .................................................. H04W 24/00
See application file for complete search history.

(56) References Cited

U.S. PATENT DOCUMENTS

| | | | |
|---|---|---|---|
| 7,545,778 B2 | 6/2009 | Sugar et al. | |
| 2002/0027897 A1 | 3/2002 | Moulsley et al. | |
| 2008/0181094 A1 | 7/2008 | Lou et al. | |
| 2008/0240208 A1 | 10/2008 | Lou et al. | |
| 2009/0102715 A1 | 4/2009 | Lou et al. | |
| 2010/0091727 A1 | 4/2010 | Ishii | |
| 2014/0010174 A1* | 1/2014 | Matsuo et al. | 370/329 |

* cited by examiner

*Primary Examiner* — Sulaiman Nooristany
(74) *Attorney, Agent, or Firm* — Edell, Shapiro & Finnan, LLC

(57) ABSTRACT

Link adaptive retransmission techniques are provided for use in connection with wireless communications between a first wireless communication device and a second wireless communication device. The first wireless communication device generates M packet error information values for the transmit session of a packet based on whether an acknowledgment message or a non-acknowledgment message is received from the second wireless communication device for a transmission and for previously sent transmissions even if less than M transmissions are sent by the first wireless communication device to the second wireless communication device upon completion of the transmit session. The first wireless communication device computes a retransmission fading margin based on the M packet error information values, from which an effective carrier-to-interference-plus-noise ratio is derived for selection of a modulation scheme.

20 Claims, 5 Drawing Sheets

| eCINR (dB) | MCS (Modulation, Coding depth) |
|---|---|
| 6 | 4 QAM, ½ |
| 9 | 4 QAM, ¾ |
| 12 | 16 QAM, ½ |
| 15 | 16 QAM, ¾ |
| 20 | 64 QAM, 2/3 |
| 21 | 64 QAM, ¾ |
| 23 | 64 QAM, 5/6 |

LINK ADAPTATION FOR RETRANSMISSION SCHEMES

CROSS REFERENCE TO RELATED APPLICATION

This application is a continuation of U.S. application Ser. No. 12/749,920, filed Mar. 30, 2010, the entirety of which is incorporated herein by reference.

TECHNICAL FIELD

The present disclosure relates to wireless communication devices and systems and more particularly to retransmission schemes.

BACKGROUND

In wireless communication networks, techniques are used to account for errors in packets or lost packets that are transmitted from one wireless communication device to another wireless communication device. One technique is to retransmit a packet when it is not received or when it is received with so many errors that it cannot be corrected using an error correction technique at the receiving device. A retransmission of a packet is generally to be avoided when possible because it makes for inefficient use of the communication channel.

Hybrid Automatic Repeat Request (HARQ or Hybrid ARQ) is an example of a retransmission scheme in which information blocks (packets) are encoded at a transmitting device for partial error correction at the receiving device, and when the receiving device indicates that it cannot correct certain errors, the transmitting device retransmits the portion of the original transmission that the receiving device could not correct.

Any performance gain that can be achieved using HARQ techniques has tradeoffs. The benefits of retransmission schemes such as HARQ techniques are that the retransmission and combination of transmissions reduces the fading margin requirement and packet error rates. In a consistent wireless channel environment, HARQ can be used to boost the modulation and coding schemes that can be used for the transmissions. However, HARQ can also reduce the transmission efficiency inherently caused by retransmissions. Even though the use of HARQ may allow for a higher modulation and coding scheme, too many retransmissions may have the overall effect of reducing total throughput.

DESCRIPTION OF EXAMPLE EMBODIMENTS

Overview

Link adaptive retransmission techniques are provided for use in connection with wireless communications between a first wireless communication device and a second wireless communication device. At the first wireless communication device, for a packet to be transmitted to a second wireless communication device, one or more transmissions of the packet are wirelessly transmitted during a transmit session to the second wireless communication device up to a maximum number M of transmissions. The first wireless communication device receives an acknowledgment message or a non-acknowledgment message from the second wireless communication device in response to a transmission that was sent by the first wireless communication device. The first wireless communication device generates M packet error information values for the transmit session based on whether an acknowledgment message or a non-acknowledgment message is received from the second wireless communication device for a transmission and for previously sent transmissions even if less than M transmissions are sent by the first wireless communication device to the second wireless communication device upon completion of the transmit session. The first wireless communication device computes a retransmission fading margin based on the M packet error information values. An effective carrier-to-interference-plus-noise ratio is generated using the retransmission fading margin and carrier-to-interference-plus-noise ratio information obtained from the second wireless communication device. A modulation scheme is selected for a next packet to be sent by the first wireless communication device to the second wireless communication device based on the effective carrier-to-interference-plus-noise ratio.

Example Embodiments

Figure 1:
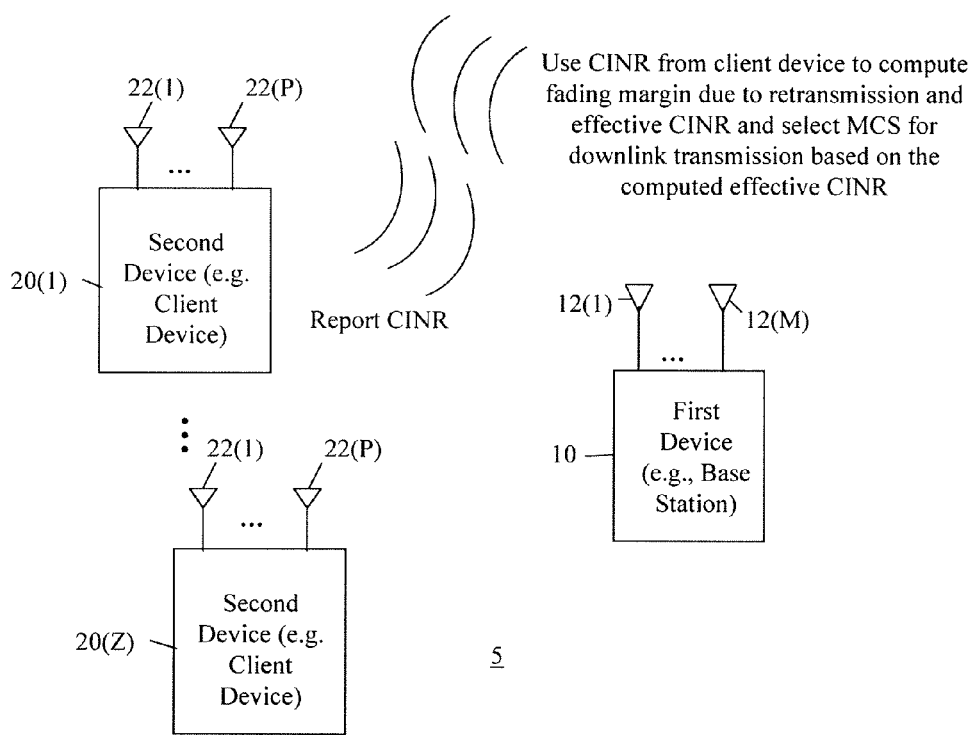
FIG. 1 is an example of a block diagram of a wireless communication network in which a first wireless communication device (e.g., a base station) is configured to adaptively select a modulation and coding scheme when employing retransmission techniques in connection with transmissions sent to a second wireless communication device (e.g., a client device).

Referring first to FIG. 1, a wireless communication network is shown at reference numeral 5. A wireless base station 10 comprising a plurality of antennas 12(1)-12(M) is provided to serve wireless communications with a plurality of wireless communication client devices 20(1)-20(Z). Each wireless client device 20(1)-20(Z) comprises at least one antenna, but in general each may comprise a plurality of antennas 22(1)-22(P). The base station 10 may be referred to herein as a first wireless communication device and the wireless client devices 20(1)-20(Z) as second wireless communication devices.

The base station 10 is configured to wirelessly communicate with the client devices 20(1)-20(Z) according to any of a variety of wireless communication standards, examples of which are the IEEE 802.16 standard known commercially as WiMAX™ and the IEEE 802.11 standard known commercially as WiFi™. The base station 10 is configured to employ retransmission scheme such as a Hybrid Automatic Repeat Request (HARQ) scheme in connection with transmissions sent to a client device, e.g., client device 20(1). Furthermore, the base station 10 is configured to employ a link adaptation scheme in order to control the link reliability and retransmission rate for transmissions to achieve link reliability gain and throughput gain. More specifically, the base station 10 receives from the client device 20(1) a message containing carrier-to-interference-plus-noise ratio (CINR) information, also referred to herein as physical CINR (pCINR), and uses the CINR to compute a fading margin due to retransmission and an effective CINR (eCINR). The base station uses the eCINR to select a modulation and coding scheme (MCS) for downlink transmissions to the client device 20(1). The client device 20(1) or any other client device that is participating in a transmit session with the base station 10 is also referred to herein as a destination wireless communication device with respect to the transmissions sourced at the base station 10. These same techniques may also be applied with respect to uplink transmissions sent from a client device to the base station 10.

Figure 2:
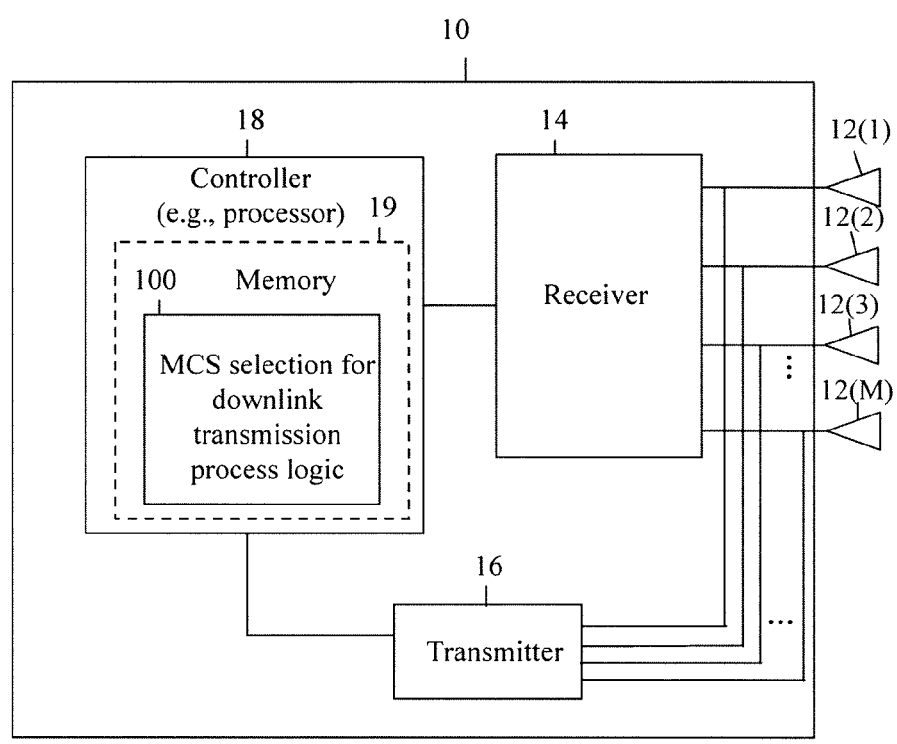
FIG. 2 is an example of a block diagram of the first wireless communication device (e.g., a base station) configured to adaptively select the modulation and coding scheme for transmissions.

Reference is now made to FIG. 2 for a description of a wireless communication device, e.g., base station 10, that is configured or equipped to perform the aforementioned retransmission and link adaptation techniques. The base station 10 comprises a receiver 14, a transmitter 16 and a controller 18. The controller 18 supplies data (in the form of transmit signals) to the transmitter 16 to be transmitted and processes signals received by the receiver 14. In addition, the controller 18 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals detected by each of the antennas 12(1)-12(M) and supplies corresponding antenna-specific receive signals to the controller 18. It is understood that the receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The transmitter 16 may comprise individual transmitter circuits that supply respective upconverted signals to corresponding ones of a plurality of antennas 12(1)-12(M) for transmission. For simplicity, these individual transmitter circuits are not shown. The controller 18 applies downlink beamforming weight vectors to the multiple downlink transmission streams (e.g., symbol streams) to produce transmit signals. The controller 18 supplies the transmit signals to the transmitter 16 and the transmitter radio frequency (RF) modulates (e.g., upconverts) the respective transmit signals for transmission via respective ones of the plurality of antennas. While the base station 10 is shown as comprising a plurality of antennas this is not necessary as the base station 10 may comprise a single antenna.

The controller 18 is, for example, a signal or data processor that comprises a memory 19 or other data storage block that stores data used for the techniques described herein. The memory 19 may be separate or part of the controller 18. Instructions for MCS selection and downlink transmission process logic 100 are stored in the memory 19 for execution by the controller 18. The MCS selection for downlink transmission process logic 100 causes the controller 18 to perform the techniques described hereinafter in connection with FIGS. 3-6.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process logic 100 may take any of a variety of forms, so as to be encoded in one or more tangible media for execution, such as with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. For example, the controller 18 may be a modem in the base station and thus be embodied by digital logic gates in a fixed or programmable digital logic integrated circuit, which digital logic gates are configured to perform the process logic 100. In another form, the process logic 100 may be embodied in a processor readable medium that is encoded with instructions for execution by a processor (e.g., controller 18) that, when executed by the processor, are operable to cause the processor to perform the functions described herein in connection with process logic 100.

The base station 10 is configured to employ a retransmission technique such as HARQ. HARQ techniques are a variation of standard automatic repeat request (ARQ) techniques. For example, in the WiMAX standard, there are two types of HARQ techniques that are employed. One type is HARQ with chase combining (HARQ CC) and another type is incremental redundancy HARQ (HARQ IR). In both of these types of HARQ techniques, the HARQ packet includes information bits, forward error correction (FEC) bits (with channel coding), and error detection bits, e.g., cyclic redundancy check (CRC) bits. In HARQ CC, each retransmission instance of the packet or frame is exactly the same as the first transmission of the packet. The receiving device detects whether the received packet is corrupted. If the packet is corrupted, the receiving device will send a non-acknowledgment (NAK) message, and if the packet is received with no errors or with errors that can be corrected, the receiving device sends an acknowledgment (ACK) message. When the maximum number of HARQ transmissions has not been reached, the receiving device will save this packet in memory. Upon reception of the next HARQ transmission, the receiving device will combine the received packet and previously received packets, and perform decoding again. In HARQ IR, each HARQ retransmission may be different. For example, the first HARQ transmission will transmit a small portion of the original packet pended with CRC and FEC bits. The nth HARQ transmission will transmit another portion of the packet pended with CRC and FEC bits. The different HARQ transmissions could have overlap or no overlap, or be exactly the same. In this sense HARQ CC is a special case of HARQ IR. The techniques described herein are applicable to any of a variety of retransmission schemes, including HARQ CC and HARQ IR scheme is designed for HARQ CC. Thus, in general, during a transmit session, each transmission of the packet or frame may comprise information bits, error correction bits and error detection bits and such that the content of each transmission instance of the packet during a transmit session may or may not be the same.

Figure 3:
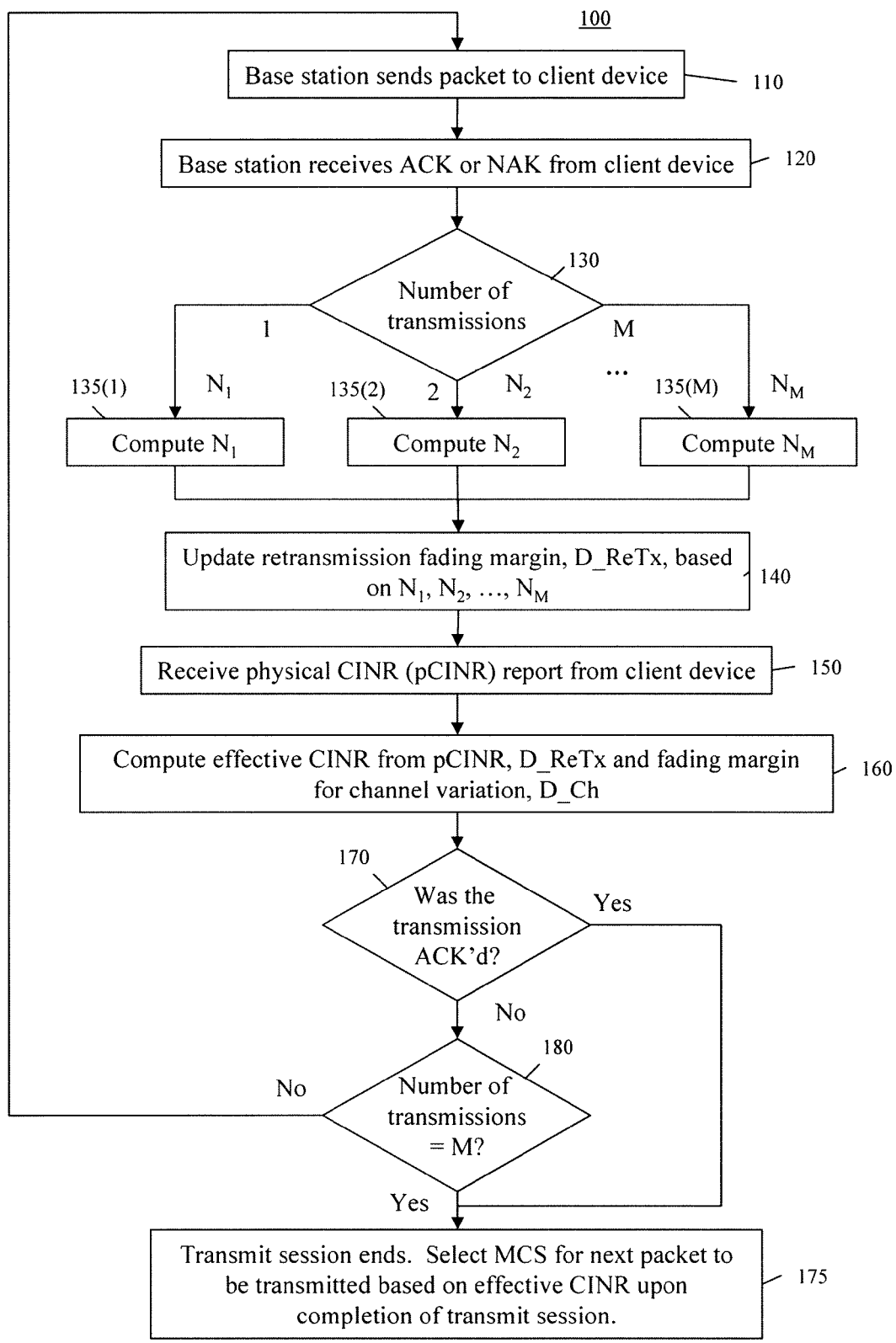
FIG. 3 is an example of a flow chart depicting a process by which the first wireless communication device adaptively selects the modulation and coding scheme for transmissions.

Reference is now made to FIG. 3 for a description of the process logic 100. The process depicted in FIG. 3 is performed for a packet or frame to be transmitted during a transmit session during which a packet may be transmitted multiple times (multiple instances) with the appropriate error detection and error correction information explained above.

The packet may occupy part or all of a frame, e.g., a WiMAX downlink frame. The techniques described herein in connection with FIG. 3 may be used in connection with HARQ retransmission techniques such as those described above, or other retransmission techniques. At 110, the base station sends a packet to a particular client device, e.g., client device 20(1), as depicted in FIG. 1. The transmission made at 110 may or may not be the first instance of the packet transmission and in general is the $i^{th}$ instance, for i=1 to M where M is the maximum number of retransmissions permitted for a transmit session of a given packet. At 120, the base station receives either an ACK message or a NAK message from the client device for the transmission. Reception of an ACK message at the base station 10 indicates to the base station 10 that the client device successfully received the packet, either with no errors or the client device was able to successfully correct any errors. Reception of a NAK message at the base station 10 indicates to the base station that the client device did not successfully receive the packet, either because the packet was entirely lost or because it contained errors that could not be corrected.

At 130, the base station 10 determines how many transmission attempts have been made for this packet. In a transmit session, a packet may be transmitted up to the maximum M number of attempts as explained above. The base station stores information for M indicating the maximum number of transmissions to be made during a transmit session for a packet. The base station 10 also maintains M variables denoted $N_1, N_2, \ldots, N_M$, each of which records a packet error (PER) information value for each transmission, whether or not each transmission was actually sent since a retransmission will not be sent if the base station receives an ACK for a previous transmission. That is, $N_1$ effectively records how many failed packets and how many successful packets for the transmission of the packet resulted after the first transmission, $N_2$ effectively records how many failed packets and how many successful packets after the second transmission, and $N_M$ effectively records how many failed packets and how many successful packets after the $M^{th}$ transmission. The M packet error information values stored in $N_1, N_2, \ldots N_M$, respectively, are used to compute a fading margin due to retransmission, denoted herein as D_ReTx.

There are specific computations made for $N_1, N_2, \ldots N_M$ as shown at 135(1), 135(2) and 135(M) based on the number of transmissions that have been made during a transmit session up to the point at which the decision 130 has been reached. The details for these computations are described hereinafter.

At 140, the retransmission fading margin, D_ReTx, is computed/updated based on the M packet error information values $N_1, N_2, \ldots N_M$. For example, the retransmission fading margin is computed as the maximum of $N_1, N_2, \ldots N_M$, that is, D_ReTx=max([$N_1, N_2, \ldots N_M$]). Moreover, the retransmission fading margin is updated after each transmission based on the PER information computed for a current transmission and PER information computed for each previous transmission. The retransmission fading margin D_ReTx is computed as a maximum of the PER information computed for the maximum number of transmissions that are possible even though the maximum number of transmissions may not be sent during a transmit session due to an ACK being received for a transmission prior to the maximum number of transmissions being sent.

At 150, the base station receives a pCINR report from the client device indicating pCINR information based on measurements made at the client device on transmissions received from the base station. The pCINR report may be periodically sent by the client device, for example every 8 frames, or every 200 frames, depending on the base station configuration.

At 160, the base station computes the eCINR from the pCINR received from the client device, the retransmission fading margin, D_ReTx computed as of a last transmission sent upon termination of the transmit session, and a fading margin for the channel variation (in the frequency domain) denoted D_Ch. For example, eCINR is computed as eCINR=pCINR−D_Ch−D_ReTx. In some cases, the channel fading margin may be fixed and in other cases it may be determined dynamically based on channel conditions at the time between the base station and the client device. This pCINR report may have been sent at the time that client device sent an ACK or NAK. The position of operation 160 in the flow chart FIG. 3 is not meant to limit when, in time, the pCINR report is received.

At 170, the base station determines whether the most recent (i.e., current) transmission has been ACK'd. If the current transmission has been ACK'd, then it is not necessary to retransmit that packet. Accordingly, the process 100 can end at 175. On the other hand, when the current transmission has not been ACK'd, then at 180 it is determined whether the number of transmissions that have been sent in this HARQ session has reached the maximum number M. If so, then the process ends at 175. Otherwise, the base station sends another transmission at 110 and the process repeats as explained above. Thus, a transmit session is terminated when an ACK message is received for a transmission or when the maximum number of transmissions has been sent. However, as explained above, when the transmit session ends before the maximum number of transmissions has been sent, values for the PER information quantities $N_1, N_2, \ldots, N_M$, are computed according to the computations explained hereinafter.

At 175, the base station selects the MCS based on the eCINR computed at 160 after the last transmission of the transmit session, that is, the last eCINR value computed during the transmit session. The base station then uses this MCS for a subsequent or future packet to be transmitted to that client device, unless and until it is updated again.

The base station updates the channel fading margin D_Ch for a given client device when it receives uplink traffic from the client device. The base station updates the retransmission fading margin when it receives an ACK or NAK for a transmission instance and updates eCINR if the channel fading margin, retransmission fading margin or pCINR report has been updated. If at least one of these quantities has not been updated, then the base station uses the previous value for that quantity. Once eCINR is updated, the base station can select an MCS accordingly. When the base station is ready to transmit a packet to the client device, it checks whether the packet is a new packet to be transmitted in which case it will use the new MCS or whether it is a retransmission of a packet in which case it will use the same MCS as the first transmission of that packet.

Figure 4:
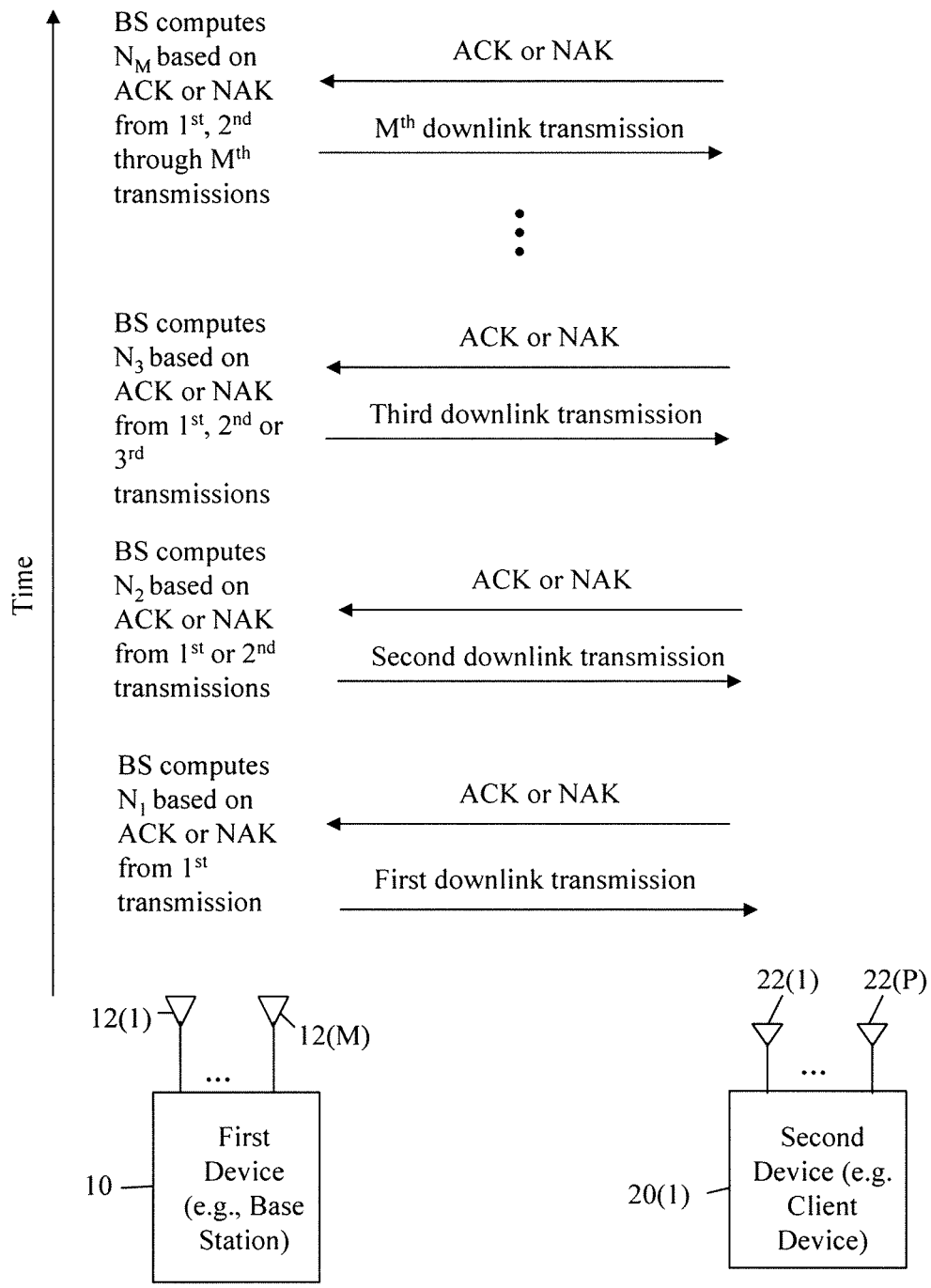
FIG. 4 is a diagram pictorially illustrating aspects of the process of the flow chart in FIG. 3.

The computations at 135(1)-135(M) are now described with reference to FIG. 4. After a transmission, a corresponding PER quantity is computed through the transmissions made up to that point, and more particularly, based on whether an ACK or NACK is received from the client device for that transmission and any prior transmissions up to that point. Each of the PER information quantities $N_1, N_2, \ldots N_M$ is set to an initial value, for example zero, at the beginning of a transmit session for transmission of a packet.

Operation 135(1) is performed after the first transmission to compute PER information $N_1$. $N_1$ is computed based on whether an ACK or NAK is received for the first transmission. When the base station receives a NAK (at 120), then $N_1$ is incremented by a predetermined value, e.g., 1, such that $N_1=N_1+1$. When the base station receives an ACK (at 120), then $N_1$ is decreased by a predetermined step value $A_1$ that is specific to the first transmission. When the base station receives an ACK for the first transmission, then the process 100 ends at 175 (FIG. 3) since there is no need to retransmit the packet when it has been completely and successfully received.

Operation 135(2) is performed after the second transmission. $N_2$ is computed based on whether an ACK or NAK are received for the first and second transmissions and whether a NAK is received from the second transmission. That is, $N_2=N_2+1$ when a NAK is received for the second transmission and $N_2=N_2-A_2$ when an ACK is received for the first or second transmission, where $A_2$ is a step-size value that is specific to the second transmission. Thus, $N_2$ is decremented when an ACK occurs for the current transmission or any previous transmission but $N_2$ is incremented by a predetermined value, e.g., 1, when a NAK occurs for the second transmission.

A similar computation occurs for the third transmission, and so on, and in general, after the $M^{th}$ transmission or when an ACK is received for one of the transmissions prior to the $M^{th}$ transmission, the $N_M$ is computed as $N_M=N_M+1$ when a NAK occurs for the $M^{th}$ transmission and $N_M=N_M-A_M$ when an ACK occurs for any of the M transmissions including the $M^{th}$ transmission. That is, the packet error information values comprises incrementing an initial packet error value when a non-acknowledgment message is received for that transmission and decrementing the initial packet error value by a step value when an acknowledgement message is received for that transmission or for any previously sent transmissions.

In summary, the operations 135(1)-135(M) generate M packet error information values for the transmit session based on whether an ACK message or a NAK message is received from the client device for a transmission and for previously sent transmissions even if less than M transmissions are sent by the base station to the client device upon completion of the transmit session. Moreover, the M packet error information values are generated based on M different step values such that a packet error information value $N_i$ is computed for an $i^{th}$ transmission as $N_i=N_i+1$ when a non-acknowledgment message is received for the $i^{th}$ transmission and $N_i=N_i-A_i$ for the $i^{th}$ transmission when an acknowledgment message is received for the $i^{th}$ transmission or for any previously transmitted transmission in the session, wherein $A_i$ is the step value.

The number M of maximum transmissions is based on the maximum number of allowable transmissions. For example, voice traffic usually has relatively strict delay requirements and so M=2 may be suitable for voice. However, data traffic may have less strict delay requirements and a larger number of retransmissions may be allowed.

The step-size values $A_1, A_2, \ldots A_M$ are used to control the PER of each transmission. $A_M$ is the final PER step-size and is chosen based on the final PER requirement, e.g., 1% for voice traffic. All other step-size values are used to control the retransmission rate and are chosen based on the throughput. These step-size values may be dynamically adjusted based on system requirements.

For example, if the PER target of the first transmission is 10%, then $A_1$ should be set to $10/100$; if the PER target of the second transmission is 1%, $A_2$ should be set to $1/100$. In another example, where M=4, $A_1=1/10$ (PER target for the first transmission is 10%), and $A_2, A_3, A_4=1/100$ (PER target for the second, third and fourth transmissions is 1%). The PER target for each transmission is based on system requirements and the total throughput. By applying these PER targets, the total system throughput, considering the overhead of retransmissions, is greater than a non-retransmission system. Using multiple PER quantities $N_1, N_2, \ldots, N_M$ instead of one value that is the same for all transmissions is useful to achieve the desired retransmission performance gain. Generally, it is expected that a retransmission technique, such as HARQ, yields higher spectral efficiency with desired link reliability. To achieve this performance gain, the PER for each retransmission is controlled because too many retransmissions would impair the final spectral efficiency even though a higher MCS may be used.

For example, a HARQ system is configured with a maximum of two transmissions. The PER requirement for the second transmission would be the PER requirement of the traffic. The PER requirement for the first transmission would be calculated based on throughput. When HARQ is not used, the transmission can be sent with a first MCS, e.g., $MCS_1$ that has $B_1$ bits/symbol. Using HARQ, the transmission can be sent with a second MCS, e.g., $MCS_2$ that has $B_2$ bits/symbol but with some possible retransmissions. To avoid throughput loss, the following relationship should be satisfied: $B_2/(1+P\_re)>=B_1$. This results in a retransmission rate $P\_re<=B_2/B_1-1$. Consequently, the PER requirement for the first transmission is at most $B_2/B_1-1$.

The performance requirement for each client device might change from time to time due the environment, channel fading and service variations. Accordingly, these performance requirement variations can be met by flexibly controlling the retransmission rate of each transmission through the calculation of $N_1, N_2, \ldots, N_M$. Using only one PER quantity N for all transmissions does not allow for control of both the final PER of a transmit session and the retransmission rate of each transmission.

To further explain, an example is provided for a non-retransmission case. If it is desired to maintain the PER target at 1%, the value of the PER value N can be decreased by 1 for a NAK and increased by $1/100$ for an ACK. In this example, N will converge to 0 if the PER target has been met. As a result, the eCINR value (which depends on pCINR and N) is well controlled and very stable.

When retransmission is used, such as a HARQ technique, there are different PER targets for each transmission due to the fact that the retransmission rate of any transmission in a transmit session has impact on the system performance. For example, for the first transmission, the PER needs to be smaller than 10%, and for the second transmission, the PER needs to be less than a smaller target, such as 1%. If only one counter is used instead of the multiple counters ($N_1, N_2, \ldots, N_M$), it would not possible for N to converge. As a result, control for the final eCINR value may be lost, and it is possible that very large or small values for eCINR may be obtained and the MCS selection would not be accurate even though the different PER target for each transmission may be satisfied. The process 100 satisfies the different PER targets, while more importantly, achieving convergence to a meaningful eCINR value for MCS selection.

Figure 5:
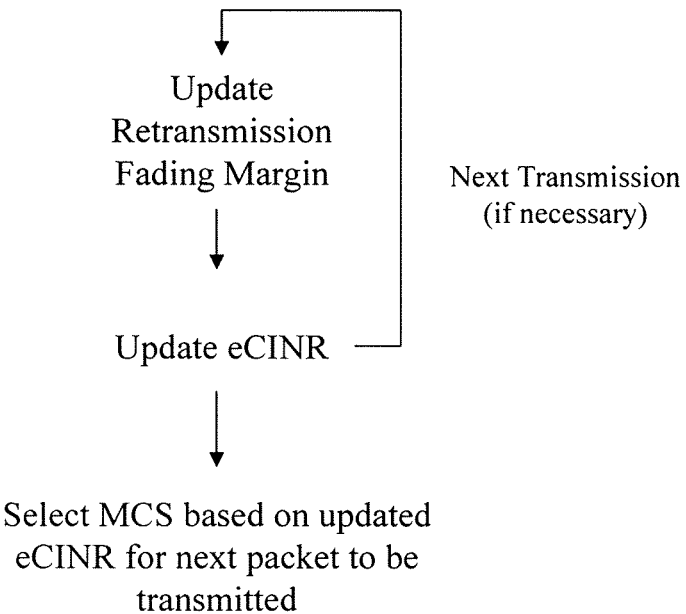
FIG. 5 is a diagram further illustrating an example of how a modulation and coding scheme is selected after a transmit session according to the process shown in FIG. 3.

Reference is now made to FIG. 5. FIG. 5 illustrates how the eCINR is updated during a transmit session for a packet to be transmitted. The PER information after each transmission is computed as explained above. A consequence of the computation for the retransmission fading margin D_ReTx based on the maximum of $N_1, N_2, \ldots N_M$ is that D_ReTx gets larger when more transmissions are needed because $N_i$ is incremented if transmission i resulted in a NAK, whereas $N_i$ is decremented if transmission i resulted in an ACK. Therefore, the eCINR is smaller for larger values of D_ReTx because of the eCINR computation eCINR=pCINR−D_Ch−D_ReTx. As shown in FIG. 5, smaller values of eCINR result in selection of lower MCS schemes, e.g., 4 QAM with a ½ coding rate for an eCINR value of 6 dB. On the other hand, D_ReTx will be quite small when only a single transmission is needed for a packet. This will cause eCINR to be larger, and consequently result in a selection of a higher MCS, e.g., 64 QAM. FIG. 5 provides examples of MCS parameters for different values of eCINR. This is meant to be an example only and other selection schemes may be employed based on eCINR values.

Figure 6:
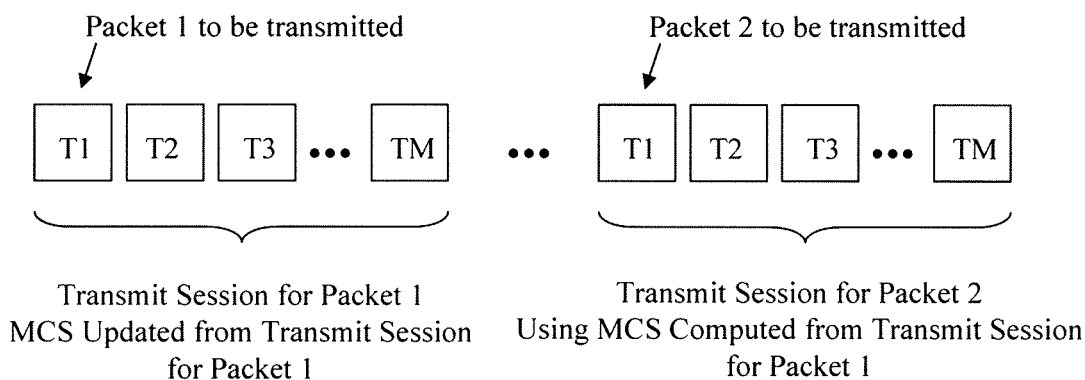
FIG. 6 is a diagram illustrating an example of how a modulation and coding scheme selected during a transmit session is used for a next packet to be transmitted.

Reference is now made to FIG. 6. During a transmit session for a given packet, e.g., packet 1, the process 100 is performed so as to compute an eCINR and to select an MCS based on the eCINR. The same MCS is used within a given transmit session. However, the MCS selected upon completion of a transmit session is used for the next packet to be transmitted. The process 100 may be performed during each transmit session, or during selected transmit sessions and not necessarily during each transmit session for each packet to be transmitted. In any case, the MCS selected after a transmit session is used for a transmit session of a subsequent or future packet.

As will become more apparent hereinafter, a wireless communication device or apparatus (base station) is provided that comprises a transmitter configured to produce transmit signals to be transmitted to a destination wireless communication device; a receiver configured to produce received signals for received wireless signals including acknowledgment messages and non-acknowledgment messages transmitted by the destination wireless communication device; and a controller configured to be coupled to the receiver and to the transmitter. The controller is configured to, for a packet to be transmitted to the destination wireless communication device, generate one or more transmissions of the packet during a transmit session up to a maximum number M of transmissions; generate M packet error information values for the transmit session based on whether an acknowledgment message or a non-acknowledgment message is received from the destination wireless communication device for a transmission and for previously sent transmissions even if less than M transmissions are sent to the destination wireless communication device; compute a retransmission fading margin based on the M packet error information values; generate an effective carrier-to-interference-plus-noise ratio using the retransmission fading margin and carrier-to-interference-plus-noise ratio information obtained from the destination wireless communication device; and select a modulation scheme for a packet to be sent to the destination wireless communication device based on the effective carrier-to-interference-plus-noise ratio.

Moreover, a processor readable medium is provided that is encoded with or stores instructions that, when executed by a processor, cause the processor to: for a packet to be transmitted to a destination wireless communication device, generate one or more transmissions of the packet during a transmit session to be wirelessly transmitted to the destination wireless communication device up to a maximum number M of transmissions; generate M packet error information values for the transmit session based on whether an acknowledgment message or a non-acknowledgment message is received from the destination wireless communication device for a transmission and for previously sent transmissions even if less than M transmissions are sent to the destination wireless communication device; compute a retransmission fading margin based on the M packet error information values; generate an effective carrier-to-interference-plus-noise ratio using the retransmission fading margin and carrier-to-interference-plus-noise ratio information obtained from the destination wireless communication device; and select a modulation scheme for a packet to be sent to the destination wireless communication device based on the effective carrier-to-interference-plus-noise ratio.

The foregoing techniques are applicable to retransmission techniques, such as HARQ techniques as well as other techniques, such as rate-shifting techniques useful in an IEEE 802.11 wireless local area network where the rate of a retransmission is based on PER information in a manner similar to that described herein.

The above description is intended by way of example only. Various modifications and structural changes may be made therein without departing from the scope of the concepts described herein and within the scope and range of equivalents of the claims.

What is claimed is:

1. A method comprising:
   at a first wireless communication device, for a packet to be transmitted to a second wireless communication device, wirelessly transmitting one or more transmissions of the packet during a transmit session to the second wireless communication device up to a maximum number M of transmissions;
   generating M packet error information values for the transmit session based on whether an acknowledgment message is received from the second wireless communication device for a transmission and for previously sent transmissions;
   computing a retransmission fading margin based on the M packet error information values;
   generating an effective carrier-to-interference-plus-noise ratio based on the retransmission fading margin; and
   selecting a modulation scheme for a future packet to be sent by the first wireless communication device to the second wireless communication device based on the effective carrier-to-interference-plus-noise ratio.

2. The method of claim 1, wherein the transmit session is a Hybrid Automatic Repeat Request (HARM) session in which each transmission for the packet comprises information bits, error correction bits and error detection bits, and wherein content for each transmission of the packet during the transmit session may or may not be the same.

3. The method of claim 1, and further comprising terminating the transmit session when an acknowledgment message is received for a transmission or the maximum number M of transmissions has been sent, wherein generating the effective carrier-to-interference-plus-noise ratio is based on the retransmission fading margin upon termination of the transmit session and wherein selecting comprises selecting the modulation and coding scheme based on the effective carrier-to-interference-plus-noise ratio computed at completion of the transmit session.

4. The method of claim 3, wherein generating packet error information values comprises incrementing an initial packet error value when no acknowledgment message is received for that transmission and decrementing the initial packet error value by a step value when an acknowledgement message is received for that transmission or for any previously sent transmissions in the transmit session.

5. The method of claim 4, wherein generating the M packet error information values is based on M different step values such that a packet error information value $N_i$ is computed for an $i^{th}$ transmission as $N_i=N_i+1$ when no acknowledgment message is received for the $i^{th}$ transmission and $N_i=N_i-A_i$ for the $i^{th}$ transmission when an acknowledgment message is received for the $i^{th}$ transmission or for any previously transmitted transmission in the session, wherein $A_i$ is the step value.

6. The method of claim 5, wherein computing the retransmission fading margin comprises computing a maximum of the M packet error information values.

7. The method of claim 1, and further comprising receiving from the second wireless communication device a message containing carrier-to-interference-plus-noise ratio information generated by the second wireless communication device based on transmissions received at the second wireless communication device from the first wireless communication device, and wherein generating the effective carrier-to-interference-plus-noise ratio is further based on the carrier-to-interference-plus-noise ratio information.

8. An apparatus comprising:
a transmitter configured to produce transmit signals to be transmitted to a destination wireless communication device;
a receiver configured to produce received signals for received wireless signals including acknowledgment messages transmitted by the destination wireless communication device; and
a controller configured to be coupled to the receiver and to the transmitter, wherein the controller is configured to:
for a packet to be transmitted to the destination wireless communication device, generate one or more transmissions of the packet during a transmit session up to a maximum number M of transmissions;
generate M packet error information values for the transmit session based on whether an acknowledgment message is received from the destination wireless communication device for a transmission and for previously sent transmissions;
compute a retransmission fading margin based on the M packet error information values;
generate an effective carrier-to-interference-plus-noise ratio based on the retransmission fading margin; and
select a modulation scheme for a packet to be sent to the destination wireless communication device based on the effective carrier-to-interference-plus-noise ratio.

9. The apparatus of claim 8, wherein the controller is configured to generate each of the transmissions as part of a Hybrid Automatic Repeat Request (HARM) session in which each transmission of the packet comprises information bits, error correction bits and error detection bits, and wherein content of each transmission of the packet during the transmit session may or may not be the same.

10. The apparatus of claim 8, wherein the controller is configured to terminate the transmit session when an acknowledgment message is received for a transmission or the maximum number M of transmissions has been sent.

11. The apparatus of claim 8, wherein the controller is configured to generate the effective carrier-to-interference-plus-noise ratio based on the retransmission fading margin computed upon termination of the transmit session, and the controller is configured to select the modulation and coding scheme based on the effective carrier-to-interference-plus-noise ratio computed at completion of the transmit session for use in transmitting a subsequent packet to the destination wireless communication device.

12. The apparatus of claim 11, wherein the controller is configured to generate the packet error information values by incrementing an initial packet error value when no acknowledgment message is received for that transmission and decrementing the initial packet error value by a step value when an acknowledgement message is received for that transmission or for any previously sent transmissions.

13. The apparatus of claim 12, wherein the controller is configured to generate the M packet error information values based on M different step values such that a packet error information value $N_i$ is computed for an $i^{th}$ transmission as $N_i=N_i+1$ when no acknowledgment message is received for the $i^{th}$ transmission and $N_i=N_i-A_i$ for the $i^{th}$ transmission when an acknowledgment message is received for the $i^{th}$ transmission or for any previously transmitted transmission in the transmit session, wherein $A_i$ is the step value.

14. The apparatus of claim 13, wherein the controller is configured to compute the retransmission fading margin by computing a maximum of the M packet error information values.

15. A non-transitory computer readable medium storing instructions, that when executed by a processor, cause the processor to:
for a packet to be transmitted to a destination wireless communication device, generate one or more transmissions of the packet during a transmit session to be wirelessly transmitted to the destination wireless communication device up to a maximum number M of transmissions;
generate M packet error information values for the transmit session based on whether an acknowledgment message or no acknowledgment message is received from the destination wireless communication device for a transmission and for previously sent transmissions;
compute a retransmission fading margin based on the M packet error information values;
generate an effective carrier-to-interference-plus-noise ratio based on the retransmission fading margin; and
select a modulation scheme for a packet to be sent to the destination wireless communication device based on the effective carrier-to-interference-plus-noise ratio.

16. The non-transitory computer readable medium of claim 15, wherein the instructions that cause the processor to generate the one or more transmissions comprise instructions that cause the processor to generate each of the transmissions as part of a Hybrid Automatic Repeat Request (HARM) session in which each transmission of the packet comprises information bits, error correction bits and error detection bits, and such that content of each transmission of the packet during the transmit session may or may not be the same.

17. The non-transitory computer readable medium of claim 15, and further comprising instructions that cause the processor to terminate the transmit session when an acknowledgment message is received for a transmission or the maximum number of transmissions has been sent.

18. The non-transitory computer readable medium of claim 17, wherein the instructions that cause the processor to generate the effective carrier-to-interference-plus-noise ratio comprise instructions that cause the processor to compute the effective carrier-to-interference-plus-noise ratio based on the retransmission fading margin computed as of termination of the transmit session, and the instructions that cause the processor to select comprise instructions that cause the processor to select the modulation and coding scheme based on the effective carrier-to-interference-plus-noise ratio computed at completion of the transmit session for use in transmitting a subsequent packet to the destination wireless communication device.

19. The non-transitory computer readable medium of claim 18, wherein the instructions that cause the processor to generate the packet error information values comprise instructions that cause the processor to increment an initial packet error value when no acknowledgment message is received for that transmission and to decrement the initial packet error value by a step value when an acknowledgement message is received for that transmission or for any previously sent transmissions.

20. The non-transitory computer readable medium of claim 17, wherein the instructions that cause the processor to compute the retransmission fading margin comprise instructions that cause the processor to compute a maximum of the M packet error information values.

* * * * *

UNITED STATES PATENT AND TRADEMARK OFFICE
CERTIFICATE OF CORRECTION

PATENT NO.         : 8,867,374 B2                                    Page 1 of 1
APPLICATION NO.    : 13/616066
DATED              : October 21, 2014
INVENTOR(S)        : Jin et al.

It is certified that error appears in the above-identified patent and that said Letters Patent is hereby corrected as shown below:

Claims

In Column 10, Line 40, claim 1, change "(HARM)" to --(HARQ)--

In Column 11, Line 45, claim 9, change "(HARM)" to --(HARQ)--

In Column 12, Line 41, claim 16, change "(HARM)" to --(HARQ)--

Signed and Sealed this
Twenty-second Day of March, 2016

Michelle K. Lee
*Director of the United States Patent and Trademark Office*